United States Patent Office 3,480,457
Patented Nov. 25, 1969

3,480,457
POLYAMIDE TAPE FOR POWER
TRANSMISSION BELTING
Howard Warner Starkweather, Jr., Wilmington, Del., assignor to E. I. du Pont de Nemours and Company, Wilmington, Del., a corporation of Delaware
No Drawing. Continuation-in-part of application Ser. No. 551,951, May 23, 1966. This application Dec. 19, 1966, Ser. No. 602,515
Int. Cl. B44d 1/32; B32b 31/12
U.S. Cl. 117—7         8 Claims

ABSTRACT OF THE DISCLOSURE

Power transmission belting is provided herein of a wear surface material adhered to a polyamide tape of improved resistance to splitting, the polyamide tape having a deformation ratio of at least 3 and a composition comprising (a) 80 to 100% by weight of a copolymer of 70 to 92% by weight of 6 or 66 nylon with 8 to 30% of each other and/or 610 nylon, and (b) 0 to 20% by weight of a plasticizer, the 8 to 30% component plus the plasticizer constituting at least 15% by weight of the composition.

This application is a continuation-in-part of Ser. No. 551,951, filed May 23, 1966, now abandoned to the same inventor.

This invention relates to improvements in the polyamide tape used in belting for the transmission of power.

Power transmission belting comprising a wear or friction surface material, such as leather or polyurethane (U.S. Pat. No. 2,999,764 to J. E. Rhoads) laminated or adhered to a polyamide tape for reinforcement is replacing belting made solely from leather or from rubber fabric combinations in many applications. The polyamide tape, and thus the belting containing it, has, however, a tendency towards longitudinal splitting in the plane substantially parallel to the principal surfaces of the tape, particularly under dry conditions.

Polyamide tape has now been discovered which exhibits an improved resistance to longitudinal splitting and has a high tensile strength. The composition of the improved tape comprises 80 to 100% by weight of a copolymer of 70 to 92% by weight of hexamethylene adipamide units (66 nylon) or units derived from caprolactam (6 nylon) with complementally to total 100% of the copolymer, 8 to 30% by weight of at least one different unit from the following: hexamethylene adipamide, units derived from caprolactam, or hexamethylene sebacamide (610 nylon), and 0 to 20% by weight based on the weight of the composition of a plasticizer for the copolymer, with the proviso that the weight of the plasticizer plus the 8 to 30% units of the copolymer totals at least 15% of the weight of the composition. A preferred tape composition is a copolymer of 75 to 85% by weight of 66 nylon and 15 to 25% of 6 nylon. Suitable plasticizers include those which are conventionally used to plasticize these polyamides, such as N-ethyl toluene sulfonamide, 2-ethylhexanediol-1,3, and tetramethylenesulfone.

The tapes of this invention are derived by orientation of ribbon-shaped polyamide billets having the above-described composition. The billets can be made by extrusion or by the molding process and apparatus disclosed in U.S. patent application Ser. No. 552,191, filed May 23, 1966 by R. T. Fields and M. J. Hartig. Orientation of the billet is carried out by passing the billet between at least one part of orienting rollers as disclosed in British Pat. No. 1,017,175 to Du Pont. This orientation is called roll orientation.

The roll orientation of the tape of this invention can be defined in terms of its deformation ratio, which is the weight per unit length before orientation divided by the weight per unit (same) length after orientation. The deformation ratio should be at least 3. Breakage of the tape during roll orientation may occur at deformation ratios above 5.3. The tensile strength of the tape is greater than 30,000 p.s.i.g., and is preferably greater than 40,000 p.s.i. The thickness of the oriented tape is at least about 0.006 in. and generally between 0.015 and 0.030 in., and the width of the tape is at least about 0.500 and generally between 2 and 4 in. For the preferred 66/6 nylon, deformation ratios of 3.9 to 4.5 give tensile strengths of about 40,000 to 55,000 p.s.i. while deformation ratios of 4.2 to 4.3 give tensile strengths of about 50,000 to 55,000 p.s.i.

In another embodiment, roll orientation of the billet can be combined with subsequent stretching to produce tapes having the above-described strengths and dimensions. This embodiment is particularly useful to produce the tapes of small thicknesses, e.g., from 0.006 to 0.010 in., with roll orientation initially reducing the thickness of the billet and stretching further reducing the thickness. Stretching can be accomplished with the equipment shown in British Pat. No. 1,017,175, in which a pair of tensioning rollers receives the roll-oriented billet directly from the roll orientation rollers, with the degree of deformation by stretching being controlled by the relative increase in surface speed from the roll-orienting rollers to the tensioning roller. Other well-known longitudinal stretching equipment can be used. In this embodiment, the roll orientation will be carried to produce an initial deformation ratio of at least about 2.0, with the amount of stretching added being sufficient to produce a total deformation ratio, short of breaking, of at least 3. A preferred range is of a deformation ratio by roll orientation from 2.4 to 3.5 accompanied by a complemental amount of longitudinal orientation by stretching to give a total deformation ratio of 3.9 to 4.5 (total deformation ratio is product of deformation ratio by rolling times deformation ratio by stretching).

The tape of this invention can be incorporated into power transmission belting by known procedures such as disclosed in U.S. Pat. No. 2,999,764. Belting made with polyamide tape of this invention has withstood severe flexure for extended periods of time without deterioration from longitudinal splitting.

Examples of polyamide tapes of the present invention are as follows. Parts and percents are by weight unless otherwise indicated.

EXAMPLE I

A billet of a copolymer of 77.5% by weight hexamethylene adipamide with 22.5% by weight of caprolactam is made by the process and apparatus described in patent application Ser. No. 552,191 is preheated to 150–170° C. by passing through a heated inert oil bath, and is roll-oriented according to British Pat. No. 1,017,175 in a single stage roll mill to give a tape characterized by a deformation ratio of 3.5, thickness of 0.027 in., width of about 3 in., and tensile strength of 41,500 p.s.i. This roll-oriented tape is coated with polyurethane elastomer and fabricated into an endless belt 1 in. wide and 12 ft. long in the manner described in U.S. Pat. No. 2,999,764. In an accelerated use test, this belt exhibits a life which is many times greater than the same belt in which the polyamide tape is caprolactam homoploymer which is oriented by stretching.

EXAMPLE II

Example I is repeated except that the deformation ratio is 4.15, the tape thickness is 0.023 in., and the tensile strength is 54,000 p.s.i.

EXAMPLE III

Example I is repeated except that the deformation ratio is 5.2, the tape thickness is 0.023 in., and the tensile strength is 56,500 p.s.i.

EXAMPLE IV

Example I is repeated except that the copolymer is 80% by weight 66 nylon and 20% by weight 6 nylon, the deformation ratio is 4.1, the tape thickness is 0.008 in., and the tensile strength is 42,000 p.s.i.

EXAMPLE V

Example IV is repeated except that the deformation ratio by roll orientation is 3.09 and the resultant tape is stretched in air by tensioning rollers operating as a take-off from the roll-orienting rollers to give a deformation ratio by stretching of 1.45. The resultant total deformation ratio is 4.48, the tape thickness is 0.027 in., and the tensile strength is 39,000 p.s.i.

EXAMPLE VI

Example I is repeated except that the composition of the tape is 80% by weight 6 nylon, 20% by weight of 66 nylon, the deformation ratio of the tape is 4.25, the thickness is 0.020 in., and the tensile strength is 50,000 p.s.i.

EXAMPLE VII

Example I is repeated except that the composition of the tape consists of (a) 93.3% by weight of a copolymer of 90% by weight 66 nylon and 10% by weight of 6 nylon and (b) 6.7% by weight of a mixture of the ortho and para-isomers of N-ethyl toluene sulfonamide commonly available as Santicizer 8, the deformation ratio is 3.3, the thickness of the tape is 0.029 in., and its tensile strength is 39,000 p.s.i.

EXAMPLE VIII

Example I is repeated except that the composition of the tape consists of a copolymer of 80% by weight of 66 nylon, 10% by weight of 6 nylon, and 10% by weight of 610 nylon, the deformation ratio is 4.1, the tape thickness is 0.025 in., and its tensile strength is 49,000 p.s.i.

EXAMPLE IX

Example I is repeated except that the composition of the tape contains 0.25% by weight of sodium phenyl phosphinate nucleating agent, the deformation ratio is 4.3, the tape thickness is 0.023 in., and its tensile strength is 53,000 p.s.i.

EXAMPLE X

Example I is repeated except that the composition of the tape consists of a copolymer of 80% by weight 66 nylon and 20% by weight of 6 nylon and two pairs of rollers are used to roll orient the 0.030 in. thick starting billet in two stages to a tape which has a thickness of about 0.010 in. and a deformation ratio of about 2.7. This tape is then drawn through two pairs of spaced tensioning rollers having a 180° C. inert oil bath therebetween for heating the tape, with the tensioning rollers operating at a tension of 160 lb. and producing a tape which has a deformation ratio by longitudinal stretching of about 1.5, a total deformation ratio of about 4.1 and tensile strength of 46,500 p.s.i.

Belting made in the manner of Example I from the tapes of Examples II to X gave similarly excellent life in terms of not longitudinally splitting in a plane substantially parallel to the principal surfaces of the type.

What is claimed is:

1. In a power transmission belting comprising a polyurethane or leather wear surface material and a polyamide tape adhered thereto, the improvement being said tape having a composition comprising 80 to 100% by weight of a copolymer of 70 to 92% by weight of hexamethylene adipamide units or units derived from caprolactam with 8 to 30% by weight, complementally to total 100% of said copolymer, of at least one different unit from the following: hexamethylene adipamide, units derived from caprolactam, or hexamethylene sebacamide; and 0 to 20% by weight, based on the weight of said composition, of a plasticizer for said copolymer, with the proviso that the weight of said plasticizer plus the 8 to 30% units of the copolymer totals at least 15% of the weight of said composition, said tape having a deformation ratio by roll orientation of at least about 2 and a total deformation ratio of at least 3.

2. In the power transmission belting of claim 1 wherein said copolymer is a copolymer of 75 to 85% by weight of hexamethylene adipamide and complementally to total 100% of said copolymer, 15 to 25% by weight of units derived from caprolactam.

3. In the power transmission belting of claim 2 wherein said total deformation ratio is from 3.9 to 4.5.

4. In the power transmission belting of claim 3 wherein the deformation ratio by roll orientation is from 2.4 to 3.5 followed by stretching to produce the remainder of said total deformation ratio.

5. In the power transmission belting of claim 3 wherein said total deformation ratio is obtained by roll orientation.

6. In the power transmission belting of claim 2 wherein the tensile strength of said tape is at least about 40,000 p.s.i.

7. In the power transmission belting of claim 2 wherein the tensile strength of said tape is at least about 50,000 p.s.i.

8. In the power transmission belting of claim 1 wherein said deformation ratio by roll orientation is at least 3.

References Cited

UNITED STATES PATENTS

| 3,354,023 | 11/1967 | Donnington et al. | 161—165 |
| 2,999,764 | 9/1961 | Rhoads | 117—47 |

FOREIGN PATENTS

| 1,017,175 | 1/1966 | Great Britain. |

OTHER REFERENCES

Lewis & Reynolds: "N-Substitution in Polyamides" in Chemistry & Industry, Nov. 10, 1951, pp. 958–61.

ALFRED L. LEAVITT, Primary Examiner

A. GRIMALDI, Assistant Examiner

U.S. Cl. X.R.

117—47, 138.8; 161—190, 22.7; 264—210, 291